United States Patent [19]

Itoyama et al.

[11] Patent Number: 5,168,851
[45] Date of Patent: Dec. 8, 1992

[54] VARIABLE CAM ENGINE POWER CONTROLLER

[75] Inventors: Hiroyuki Itoyama; Hiroshi Komatsu, both of Yokohama, Japan

[73] Assignee: Nissan Motor Co., Ltd., Yokohama, Japan

[21] Appl. No.: 798,084

[22] Filed: Nov. 27, 1991

[30] Foreign Application Priority Data

Nov. 29, 1990 [JP] Japan .................................. 2-332599

[51] Int. Cl.⁵ ........................ F01L 1/34; F02D 11/10; F02P 5/15
[52] U.S. Cl. ................................ 123/399; 123/90.16; 123/416
[58] Field of Search ............... 123/90.15, 90.16, 90.17, 123/361, 399, 416, 417, 418, 425

[56] References Cited

U.S. PATENT DOCUMENTS

| | | | |
|---|---|---|---|
| 4,735,183 | 4/1988 | Inoue et al. | 123/399 |
| 4,765,296 | 8/1988 | Ishikawa et al. | 123/399 |
| 4,873,949 | 10/1989 | Fujiyoshi et al. | 123/90.16 |
| 4,887,561 | 12/1989 | Kishi | 123/90.16 |
| 4,960,095 | 10/1990 | Koike et al. | 123/425 |
| 5,016,588 | 5/1991 | Pagdin et al. | 123/399 |
| 5,033,420 | 7/1991 | Matayoshi et al. | 123/90.16 |
| 5,060,604 | 10/1991 | Seki et al. | 123/90.16 |
| 5,078,109 | 1/1992 | Yoshida et al. | 123/399 |

FOREIGN PATENT DOCUMENTS 63-167016 7/1988 Japan .
64-80733 3/1989 Japan .

*Primary Examiner*—Willis R. Wolfe
*Attorney, Agent, or Firm*—Foley & Lardner

[57] ABSTRACT

A power controller is provided for a variable cam engine wherein an economy cam and power cam are changed over according to the running condition of the engine. To control engine power, the engine is provided with a throttle valve whose opening basically corresponds to the accelerator depression, but which can be varied freely independently of same. When a change-over is made between cams, the throttle valve is controlled to a target throttle opening such that the torque generated before and after the change-over is the same. At the same time, to prevent the occurrence of a torque shock when the economy cam is changed over to a power cam, the throttle valve is throttled to the target opening before the change-over is acutally made and the ignition timing is retarded taking account of the change-over period. Likewise, when a power cam is changed over to the economy cam, the throttle valve is opened to the target opening before the change-over is actually made, the ignition timing is retarded, but it is then returned to the original optimum ignition timing when the change-over period is reached.

10 Claims, 19 Drawing Sheets

VARIABLE CAM ENGINE POWER CONTROLLER

BACKGROUND OF THE INVENTION

This invention relates to an engine wherein the characteristics of the cams driving the air intake and exhaust valves can be selected according to the running condition of the engine, and more particularly, to a control system for controlling the engine power when a cam change-over is made in such an engine.

FIELD OF THE INVENTION

The optimum timing of the air intake and exhaust valves of an engine differ according to the running conditions of the engine. At high speed, for example, a large valve lift and a long valve opening period (valve overlap) are required in order to obtain high torque, while on partial load, when fuel cost performance is more important than torque, a small valve lift and short long opening period are required to reduce pumping loss. If the running conditions of the engine varied widely, as in the case of a car engine for example, it was thus impossible to attain the operating characteristics required by the intake and exhaust valves over the entire range of conditions. In Tokkai Sho 63-167016 (Koho) published by the Japanese Patent Office, a variable cam engine is proposed wherein several cams with different shapes are provided, and the operating characteristics of the air intake and exhaust valves are made to coincide with the required characteristics over a broad range of running conditions.

In such a variable cam engine, an economy cam which gives good fuel cost performance on partial load and a power cam which generates large torque on full load are provided, and cam change-overs are made to correspond with the accelerator depression. When the accelerator depression is small, the economy cam is selected, and when the accelerator depression is large, the power cam is selected.

However, the air-fuel mixture aspirated into a cylinder in one air intake process varies depending on the type of cam driving the air intake valve. When a cam change-over is made, therefore, an output power change is produced due to the difference of air charging efficiency in the cylinder even if the throttle opening remains the same.

If for example the economy cam is changed over to a power cam, the air charging efficiency increases and the output power therefore increases considerably immediately after making a change-over. If on the other hand a power cam is changed over to the economy cam, the output power decreases considerably. A large torque shock is thus produced and driving performnace of the vehicle is seriously affected even if the throttle opening is essentially the same before and after a cam change-over.

SUMMARY OF THE INVENTION

It is therefore an object of this invention to prevent torque variations during a cam change-over, and to maintain smooth running performance, in a variable cam engine.

In order to accomplish the above object, this invention provides a power controller for a variable cam engine having a cylinder, and intake and exhaust passages connected to the cylinder, a throttle valve installed in the intake passage, an accelerator pedal controlling an aperture of the throttle valve, an igniter igniting a fuel in the cylinder, valves fitted to the intake and exhaust passages to open and close the passages, one of these valves being driven selectively by a power cam having a profile which gives a large output torque to the engine and an economy cam having a profile which gives good fuel cost performance, means for selecting a cam from among the cams according to a running condition of the engine, and a cam change-over mechanism which disengages a current cam from the valve and engages the selected cam instead.

The power controller comprises means for detecting the depression of the acceleration pedal, means for controlling the opening of the throttle valve according to the accelerator depression, means for detecting a current opening of the throttle valve, means for computing a target opening of the throttle valve after the cam change-over such that a torque generated after the cam change-over is the same as a torque generated before the cam change-over, means for correcting the opening of the throttle valve to the target opening computed, when the cam change-over is performed, means for comparing the target opening computed an d the current opening of the throttle valve, means for advancing the correction of the throttle valve opening to the target opening at a predetermined time period before the cam change-over, when the target opening computed is smaller than the current opening, means for controlling an ignition timing of the igniter to an optimum timing for generating maximum output torque, and means for retarding the ignition timing during a predetermined period from the cam change-over.

In order to achieve the same object, this invention provides another power controller for a variable cam engine, comprising means for detecting the depression of the accelerator pedal, means for controlling the opening of the throttle valve according to the accelerator depression, means for detecting a current opening of the throttle valve, means for computing a target opening of the throttle valve after the cam change-over such that a torque generated after the cam change-over is the same as a torque generated before the cam change-over, means for correcting the opening of the throttle valve to the target opening computed, when the cam change-over is performed, means for comparing the target opening computed and the current opening of the throttle valve, means for advancing the correction of the throttle valve opening to the target opening at a predetermined time period before the cam change-over, when the target opening computed is larger than the current opening, means for controlling a ignition timing of the igniter to an optimum timing for generating maximum output torque, and means for retarding the ignition timing during a predetermined period preceding the cam change-over.

In order to achieve the same object, this invention provides yet another power controller for a variable cam engine, comprising means for detecting the depression of the accelerator pedal, means for controlling the opening of the throttle valve according to the accelerator depression, means for detecting a current opening of the throttle valve, means for computing a target opening of the throttle valve after the cam change-over such that a torque generated after the cam change-over is the same as a torque generated before the cam change-over, means for correcting the opening of the throttle valve to the target opening computed, when the cam change-over is performed, means for comparing the target opening computed and the current opening of the throttle valve, means for advancing the correction of the throttle valve opening to the target opening at a predetermined time period before the cam change-over, when the target opening computed is smaller than the current opening, means for controlling an ignition timing of the igniter to an optimum timing for generating maximum output torque, means for retarding the ignition timing during a predetermined period from the cam change-over, and means for controlling a ratio of air and fuel supplied to the engine by a predetermined amount toward a leaner value during a certain time period including the time of the cam change-over.

In order to achieve the same object this invention provides yet another power controller for a variable cam engine, comprising means for detecting the depression of the accelerator pedal, means for controlling the opening of the throttle valve according to the accelerator depression, means for detecting a current opening of the throttle valve, means for computing a target opening of the throttle valve after the cam change-over such that a torque generated after the cam change-over is the same as a torque generated before the cam change-over, means for correcting the opening of the throttle valve to the target opening computed, when the cam change-over is performed, means for comparing the target opening computed and the current opening of the throttle valve, means for advancing the correction of the throttle valve opening to the target opening at a predetermined time period before the cam change-over, when the target opening computed is larger than the current opening, means for controlling a ignition timing of the igniter to an optimum timing for generating maximum output torque, means for retarding the ignition timing during a predetermined period preceding the cam change-over, and means for controlling a ratio of air and fuel supplied to the engine by a predetermined amount toward a leaner value during a predetermined time period preceding the cam change-over.

DESCRIPTION OF THE PREFERRED EMBODIMENTS

Figure 1:
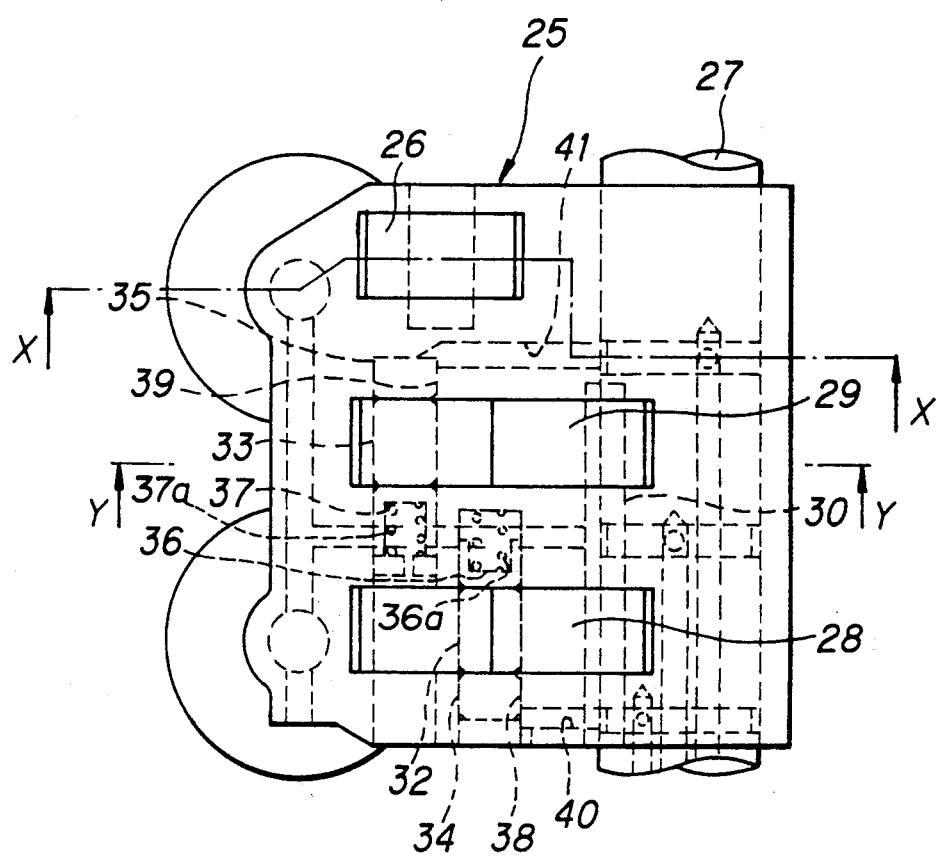
FIG. 1 is a plan view of a cam selecting mechanism of a variable cam engine according to this invention.
Figure 2:
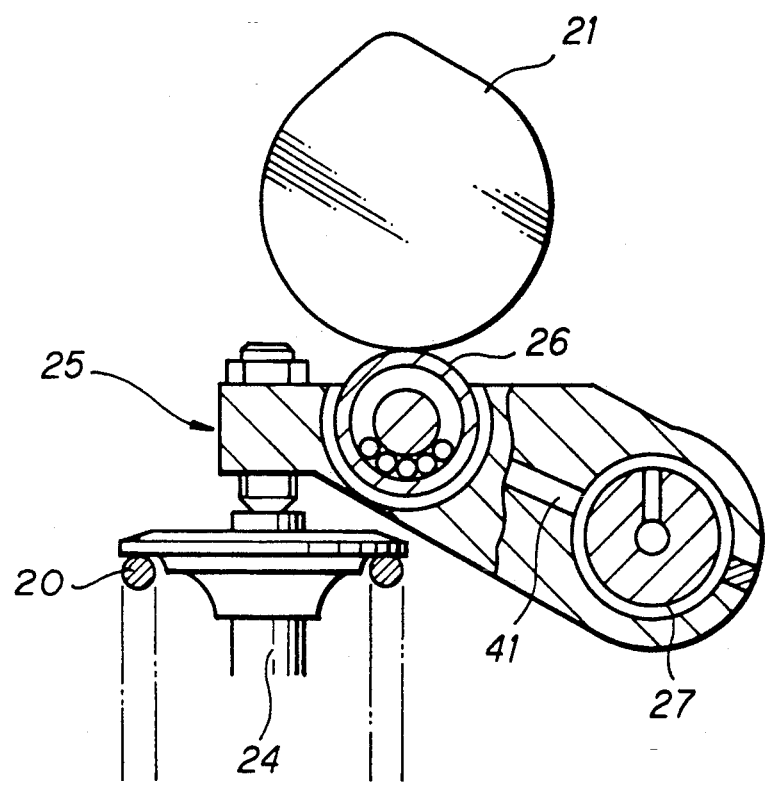
FIG. 2 shows a section through the line X—X in FIG. 1.
Figure 3:
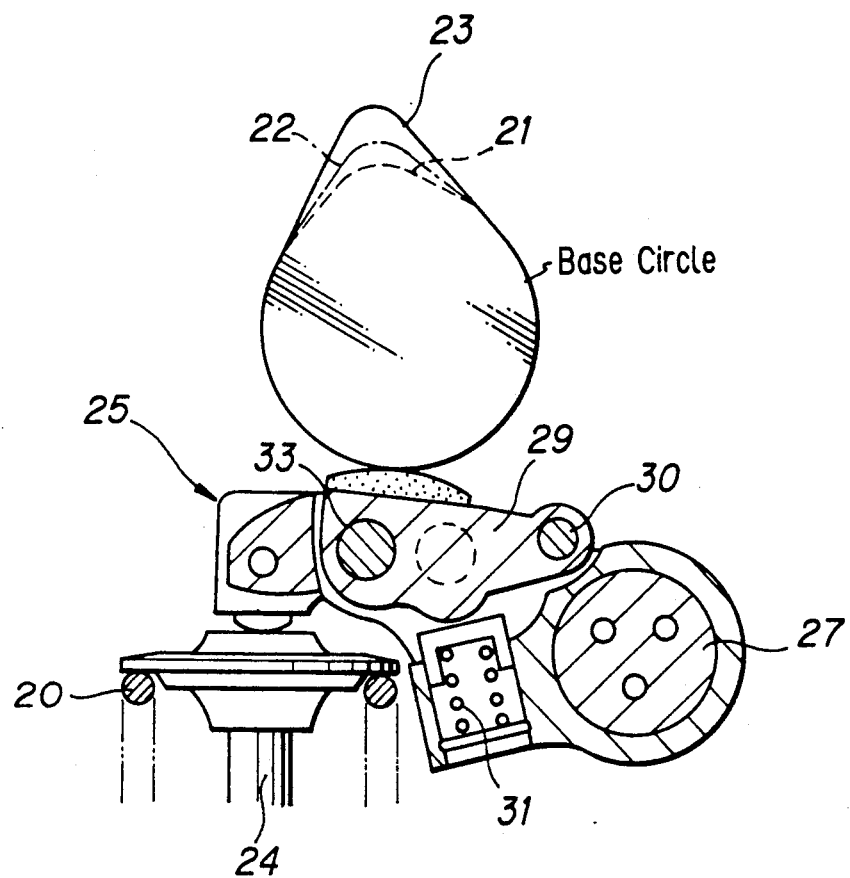
FIG. 3 shows a section through the line Y—Y in FIG. 1.

FIGS. 1, 2 and 3 show the structure of the cam selecting mechanism.

A first cam 21 (economy cam) has a shape which gives both a small cam lift amount and short lift period, and is set such that it gives good fuel cost performance on partial load.

A second cam 22 (low speed power cam) has a shape which gives a larger cam lift amount and longer lift period than the first cam 21, and is set such that it generates a large torque at low speeds.

A third cam 23 (high speed power cam) has a shape which gives a still higher lift amount and longer lift period than the second cam 22, and is set such that it generates a large torque at high speeds.

Figure 4:
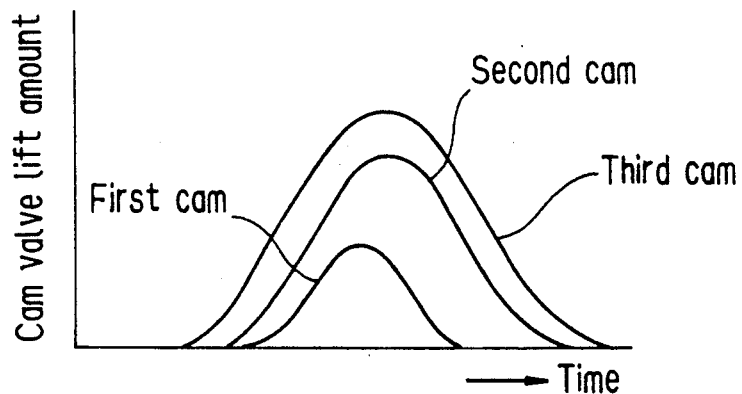
FIG. 4 is a graph showing the cam lift characteristics of the variable cam engine according to this invention.

The lift characteristics of these cams 21-23 are shown in FIG. 4. The base circle positions of cams 21-23 which are shown in FIG. 3 represent the non-lift intervals of these cams.

These cams 21, 22, 23 are arranged in series on the same cam shaft, not shown, and rotate together in synchronism with the engine revolution.

An air intake valve 24 is elastically supported in a closed position by a spring 20, and opened and closed by a main rocker arm 25 which pivots about a rocker shaft 27 supported by the engine cylinder head.

A roller 26 is attached to the main rocker arm 25 such that it can rotate freely. As shown in FIG. 2, the first cam 21 is in contact with this roller 26 and pushes the main rocker arm 25 down according to its rotation position to open the valve 24 against the force of the spring 61.

Two parallel grooves are formed on one side of the roller 26 in the main rocker arm 25. In these grooves, two sub-rocker arms 28 and 29 are provided which pivot about a common shaft 30 that is supported by the main rocker arm 25.

The sub-rocker arm 29 is supported such that it is in contact with the third cam 23 by a spring 31 inserted between the sub-rocker arm 29 and the main rocker arm 25 as shown in FIG. 3. Similarly, the sub-rocker arm 28 is supported such that it is in contact with the second cam 22 under the force of another spring. The sub-rocker arms 29 and 28 therefore pivot about the shaft 30 according to the rotation of the cams 23 and 22 respectively.

A cylindrical pin 33 is inserted in a channel running horizontally through the sub-rocker arm 29 such that it is free to slide on the inside of the channel. A hydraulic chamber 39 of the same cross-section as this channel opens onto the inside of the groove in the main rocker arm 25 which accommodates the sub-rocker arm 29, and another pin 35 of the same cross-section as the pin 33 is free to slide on the inner surface of the chamber 39. The pins 33 and 35 are positioned coaxially in the base circle position of the third cam 23 corresponding to its non-lift position shown in FIG. 3.

A hole of the same cross-section as the aforesaid channel and the hydraulic chamber 39 of the sub-rocker arm 29 is provided in the opposite wall to the hydraulic chamber 39 of the groove housing the sub-rocker arm 29. A plunger 37 is inserted in this hole under the force of a return spring 37a. When there is no pressurized oil acting on the hydraulic chamber 39, the pins 33 and 35 are pushed by the plunger 37 which is under the force of the return spring 37a so that they are held respectively in the channel of the sub-rocker arm 29 and the hydraulic chamber 39. In this state, the sub-rocker arm 29 can pivot freely with respect to the main rocker arm 25 according to the rotation of the third cam 23.

When pressurized oil is led through a passage 41 into the hydraulic chamber 39 in the base circle position of the third cam 23, the pins 35 and 33 which are positioned coaxially are pushed out by a predetermined distance against the force of the return spring 37a. Part of the pin 35 then enters the channel in the sub-rocker arm 29 and part of the pin 33 enters the hole in the main rocker arm housing the plunger 37 causing the sub-rocker arm 29 to engage with the main rocker arm 25.

Similarly, the sub-rocker arm 28 is caused to engage selectively with the main rocker arm 25 by means of an engaging mechanism which comprises pins 32 and 34, a return spring 36a, a plunger 36, a hydraulic chamber 38 and a passage 40.

When the sub-rocker arm 29 is engaged with the main rocker arm 25, the valve 24 opens and closes according to the motion of the third cam 23. This is due to the fact that the third cam 23 has a larger lift and longer lift period than the first cam 21, so that the motion of the first cam 21 is not transmitted to the main rocker arm 25.

When the sub-rocker arm 29 is not engaged with the sub-rocker arm 25, and the sub-rocker arm 28 is engaged with the main rocker arm 25, the valve 24 opens and closes according to the motion of the second cam 22. When neither of the sub-rocker arms 28 and 29 are engaged with the main rocker arm 25, the valve 24 opens and closes according to the motion of the first cam 21.

In all cases, when the cams 21-23 are in the base circle position as shown in FIGS. 2 and 3, the main rocker arm 25, and the sub-rocker arms 28 and 29 are all in the non-lift position so that the air intake valve 24 is closed. Change-overs between the cams 21-23 are made during this non-lift interval.

Figure 5:
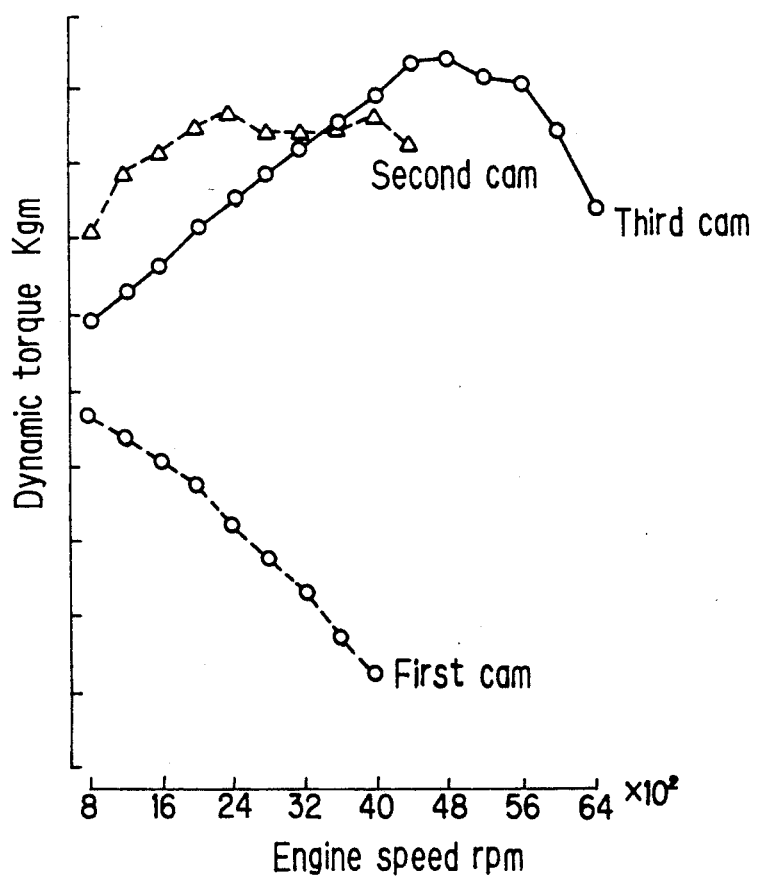
FIG. 5 is a graph showing output characteristics on full throttle of the variable cam engine according to this invention.

FIG. 5 shows the torque characteristics of the cams 21-23 at full throttle. The first cam 21 generates a small torque over the whole range of speeds but it gives good fuel cost performance. The second cam 22 generates its maximum torque in the low speed region, while the third cam 23 generates its maximum torque in the high speed region.

Figure 6:
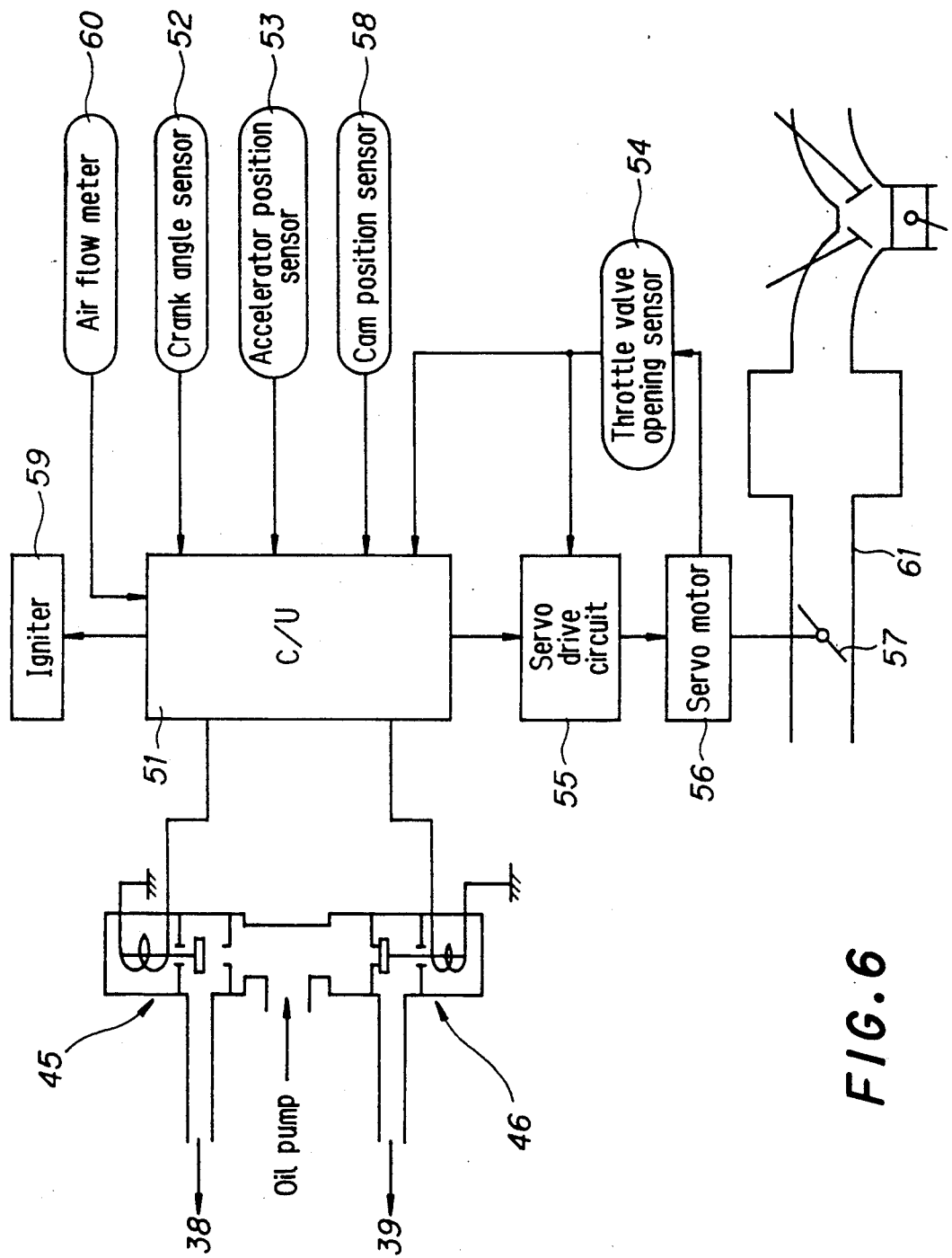
FIG. 6 is a schematic diagram of a construction of a power control mechanism according to this invention.

The change-overs between the 21, 22 and 23 are performed by a control unit 51 as shown in FIG. 6.

The control unit 51 is supplied with signals indicative of crankshaft angle of the engine from a crank angle sensor 52, accelerator depression amount from an accelerator position sensor 53 and currently applied cam from a cam position sensor 58. The control unit 51 is provided with a control map shown in FIG. 9 which sets the regions in which change-overs between the cams 21-23 are to be made, and it controls cam change-overs according to the accelerator depression and the engine speed based on these signals as described hereinafter.

Figure 9:
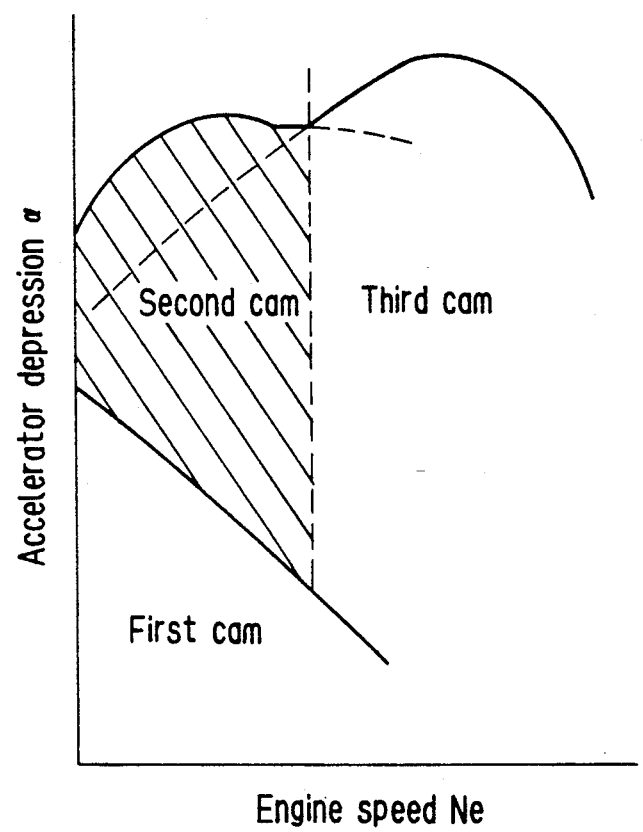
FIG. 9 is a graph showing cam change-over regions according to this invention based on an accelerator depression and engine speed.

For example in FIG. 9, when the cam selected lies in the region of the first cam 21, i.e. the economy cam, this cam 21 is selected.

If the accelerator depression is then increased to a region where the required torque is large but the engine speed is relatively low, i.e. to the region of the second cam 22 which is the low speed power cam, this second cam 22 is selected. If the engine speed increases further to the region of the high speed power cam, this third cam 23 is selected.

To change over to the cam which has been selected, the control unit 51 outputs a cam change-over signal to solenoid valves 45 and 46 shown in FIG. 6 in order to supply pressurized oil to the aforesaid two hydraulic chambers 38 and 39, and a cam change-over is thereby performed by the opening and closing of the solenoid valves 45 and 46.

When the solenoid valve 45 is opened, pressurized oil is led from the oil pump, not shown, to the hydraulic chamber 38 so as to cause the sub-rocker arm 28 to engage with the main rocker arm 25. When on the other hand the solenoid valve 46 is opened, pressurized oil is led from the oil pump to the hydraulic chamber 39 so as to cause the sub-rocker arm 29 to engage with the main rocker arm 25. These actions cause the selected cam to become engaged.

The control valve also controls the opening of the throttle valve 57 installed in an air intake passage 61. The throttle valve 57 is opened and closed by a servomotor 56 based on a throttle valve opening signal generated by the control unit 51 and amplified by a servodrive circuit 55. At the same time, a signal indicative of the actual opening of the throttle valve 57 is fed back from a throttle valve opening sensor 54 to the servodrive circuit 55, in order to apply a correction to the servomotor 56 such that the actual throttle valve opening coincides with a target throttle valve opening output by the control unit 51.

To determine the target throttle valve opening, the control unit 51 determines the torque required from the signal from the accelerator depression sensor 53, and computes the throttle valve opening required to generate this required torque from the cam in use.

Further, a signal indicative of air flow volume is input to the control unit 51 from an air flow meter 60 installed further upstream in the air flow passage 61 than the throttle valve 57. Based on this air flow volume and the engine speed, an optimum ignition timing $ADV_n$ which gives the best torque is computed for the current running conditions, and this ignition signal is output to an igniter 59 so as to ignite a spark plug, not shown.

If however a cam change-over is made due to a change in the running condition of the engine, the throttle valve opening to produce the required torque corresponding to the accelerator depression differs according to the selected cam.

To maintain the same torque before and after cam change-over, therefore, the control unit 51 computes the torque generated before the cam change-over based on which cam is applied and the throttle valve opening at that time, and a target throttle valve opening required to generate the same torque using the cam after change-over, then proceeds to correct the throttle valve opening at the same time that the cam change-over is performed.

However, the actual air volume (air-fuel volume) aspirated into the engine cylinder immediately after cam change-over is affected by the negative intake pressure depending on the throttle valve opening before cam change-over remaining downstream of the throttle valve 57. Even if the throttle valve opening is corrected, therefore, the air volume necessary to generate the required torque is different immediately after cam change-over, and the required torque immediately after cam change-over therefore temporarily deviates from the target value.

The manner in which the engine torque varies will now be described in the case of a change-over from the first cam 21 (economy cam) to the second cam 22 (low speed power cam), with reference to FIG. 15.

Figure 15:
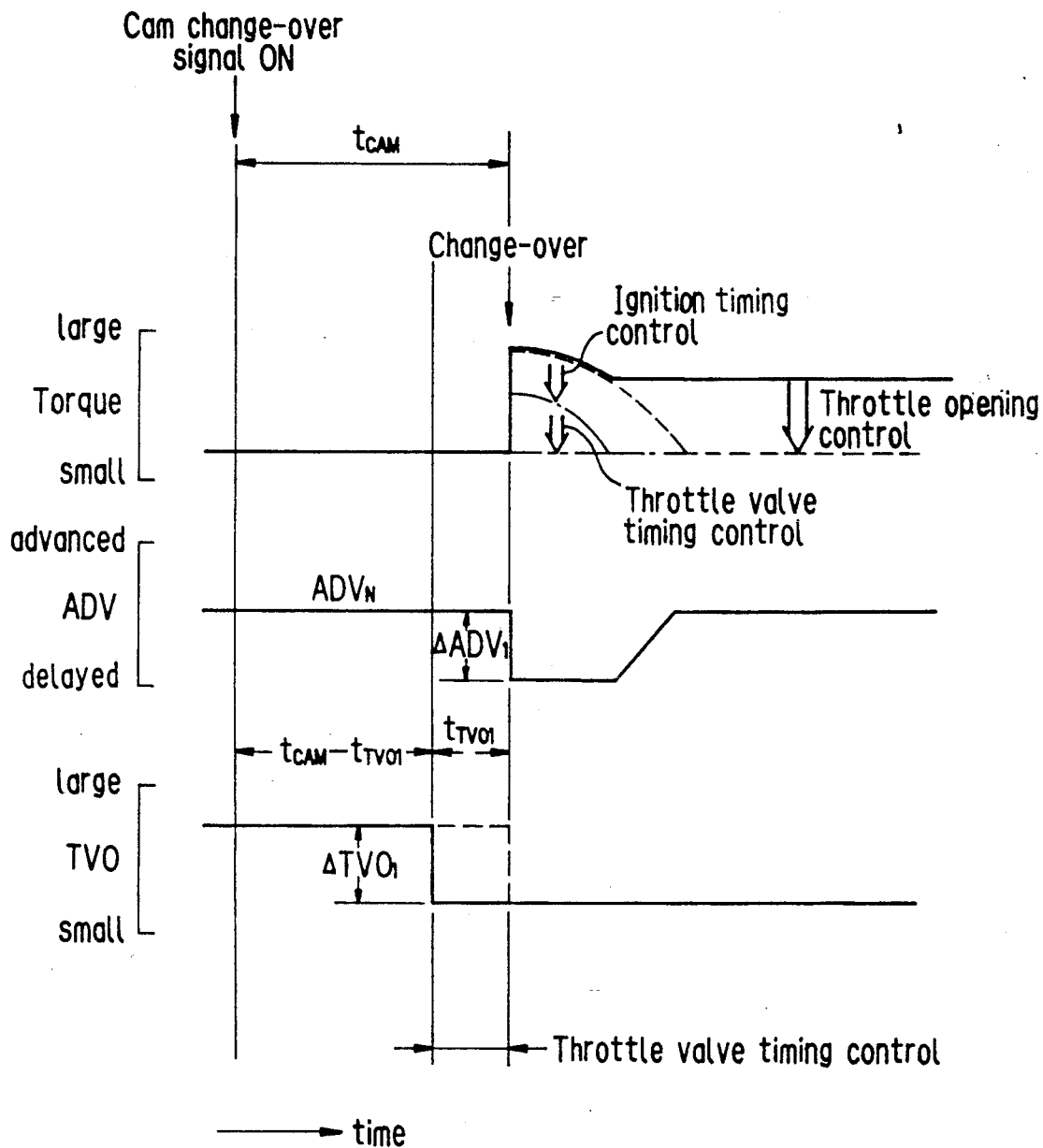
FIG. 15 is a wave pattern showing control characteristics of engine torque, ignition timing and throttle opening when a change-over is made from the economy cam to a power cam.

The upper area of FIG. 15 shows the variation of torque when a change-over is made from the economy cam to the power cam. At the change-over point, if the throttle valve opening is closed by a predetermined amount $\Delta TVO_1$ (shown by a broken line) in the lower part of the figure, the torque will return to its value before the change-over slightly later on.

Due however to the small negative intake pressure (small boost) which existed downstream of the throttle valve 57 immediately after cam change-over, the air volume aspirated into the cylinder (air-fuel mixture) is greater than the target volume, and the torque generated therefore increases temporarily.

According to this invention, the increased torque immediately after cam change-over is dealt with by delaying the MBT (Minimum Advance for Best Torque) on which the ignition timing is based, by a predetermined amount $\Delta ADV_1$. This causes the combustion to be delayed, and decreases the power that can be obtained from the engine as effective torque.

However, it is difficult to absorb this torque variation completely just by correcting the ignition timing, and if the ignition timing is given a very large retardation angle, it is difficult to maintain stable combustion.

The residual torque variation shown by a broken line in the upper part of the figure is therefore eliminated by closing the throttle valve 57 at a predetermined time $tTVO_1$ earlier than the time at which the cam change-over is actually performed.

When a cam change-over signal is output, a mechanical response time tCAM is required until the change-over is actually made. The torque variation before and after the cam change-over is thus totally absorbed by closing the throttle 57 by an amount $\Delta TVO_1$ after a time ($tCAM - tTVO_1$) starting from the time when the cam change-over signal is output, and retarding the ignition by an amount $\Delta ADV_1$ when the time tCAM has elapsed.

Figure 7:
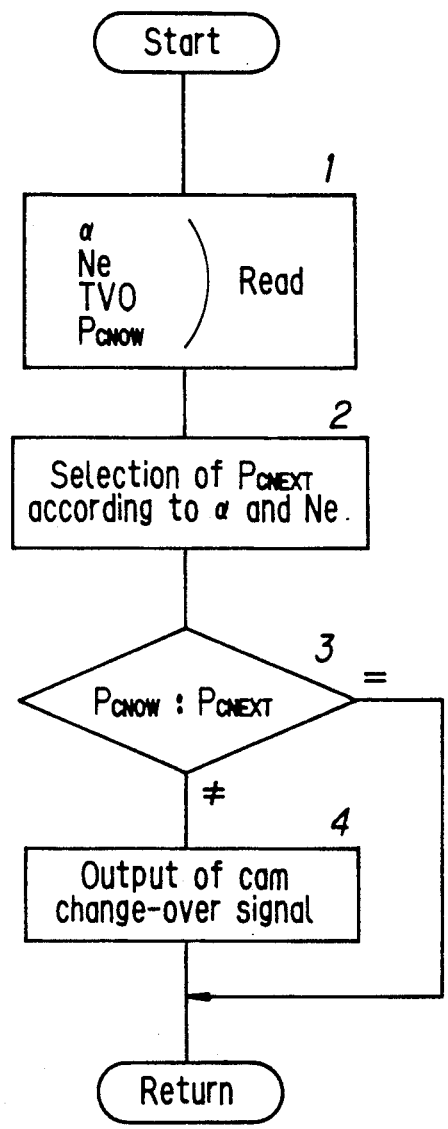
FIG. 7 is a flowchart showing a cam change-over control process of the variable cam engine according to this invention.

The control operations involved in the cam change-over are described by the flowchart of FIG. 7. The accelerator depression $\alpha$ is read from the accelerator depression sensor 53, the engine speed Ne is read from the crankshaft angle sensor 52, the throttle valve opening TVO is read from the throttle valve opening sensor 54 and the signal showing which cam is currently applied is read from the cam position sensor 58, and the optimum cam Pcnext is selected depending on the running conditions of the engine according to the map of FIG. 9 from $\alpha$ and Ne (steps 1 and 2).

If the selected cam Pcnext is different from the current cam Pcnow, a change-over signal is output to change over to a new cam (steps 3 and 4).

Figure 8:
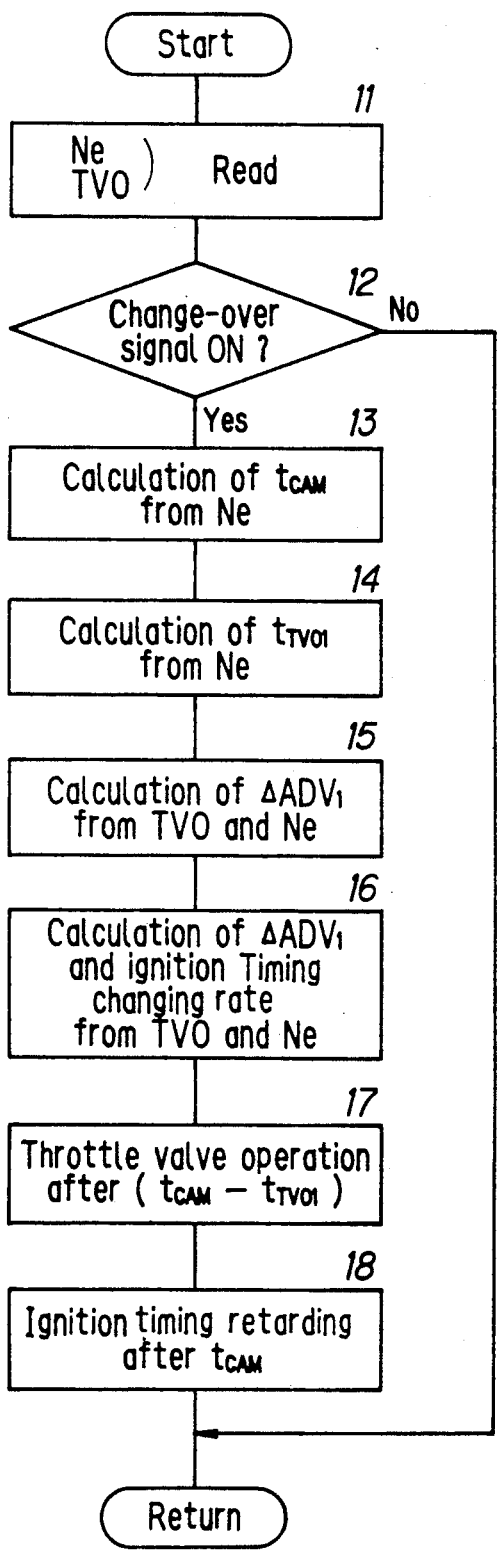
FIG. 8 is a flowchart showing a control process of a throttle valve opening and ignition timing according to this invention when a change-over is made from an economy cam to a power cam.

Then, to prevent the occurrence of a torque shock due to this cam change-over as described hereintofore, the throttle opening and ignition timing are corrected at the same time as shown by the flowchart of FIG. 8.

In FIG. 8, it is determined from the engine speed Ne and the throttle valve opening $TVO_0$ whether or not a cam change-over has taken place (steps 11 and 12), and if it has, the program proceeds to a step 13.

The case will be considered where a change-over is made from the first cam 21 (economy cam) to the second cam 22 (power cam). FIG. 15 shows the variation of engine power at this time.

Figure 10:
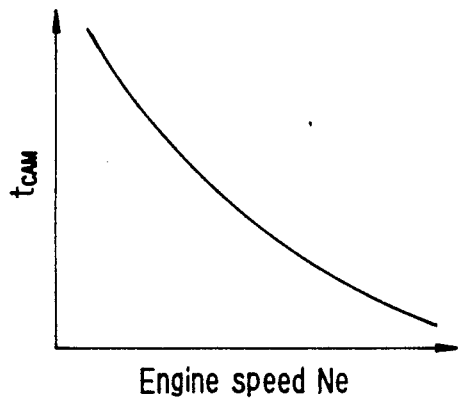
FIG. 10 is a graph showing a cam change-over period base on the engine speed.

In the step 13, the cam response time tCAM from when a cam change-over signal is output to the time when the change-over is actually made, is computed based on the engine speed Ne at that time with reference to the map of FIG. 10. In a step 14, a time $tTVO_1$ is computed to correct the opening of the throttle valve 57 earlier than the actual cam change-over based on the engine speed with reference to the map of FIG. 11.

Figure 12:
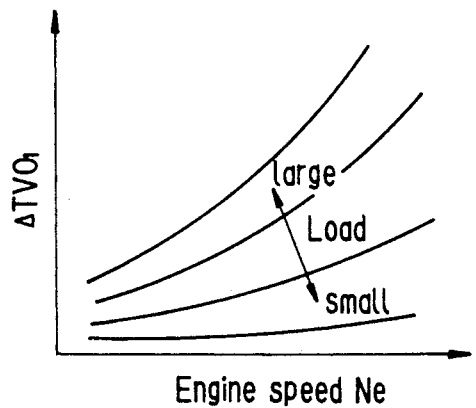
FIG. 12 is a graph showing a decreasing amount of the throttle valve opening according to this invention based on the engine based and an engine load.

In a step 15, a throttle valve opening correction $\Delta TVO_1$ required to maintain the same torque when the first cam 21 is changed over to the second cam 22 is computed based on the engine speed Ne and the accelerator depression (referred to hereinafter as engine load), with reference to the map of FIG. 12.

Separate maps to determine a throttle valve opening correction are prepared to correspond to the cases when a change-over is made from the first cam to the second cam, from the first cam to the third cam and from the second cam to third cam, an appropriate map being selected for each particular case.

Figure 13:
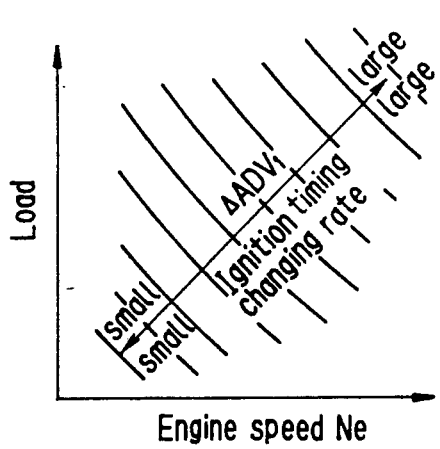
FIG. 13 is a graph showing a correction amount of an ignition timing according to this invention based on the engine speed and engine load.

In a step 16, a retardation angle $\Delta ADV_1$ of the ignition timing is computed based on the engine speed Ne and the engine load with reference to the map of FIG. 13.

Figure 11:
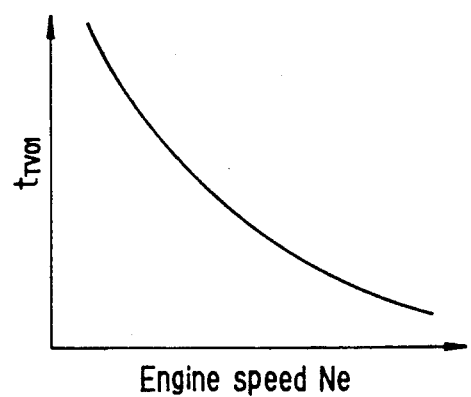
FIG. 11 is a graph showing a throttle operation period according to this invention based on the engine speed.

In FIGS. 10 and 11, it is seen that the values of the response time tCAM and $tTVO_1$ decrease as the engine speed Ne increases, due to the fact that the response is more rapid in the high speed region. Conversely, in FIGS. 12 and 13, it is seen that the values of $\Delta TVO_1$ and $\Delta ADV_1$ increase for higher loads, due to the fact that the torque step increases as the engine load increases.

Figure 14:
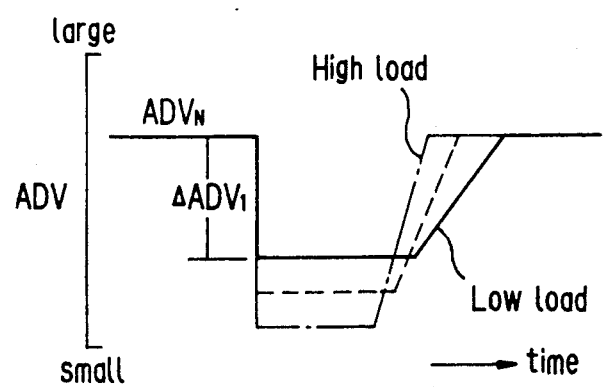
FIG. 14 is a wave pattern showing characteristics of retardation correction of the ignition timing according to this invention based on the engine load.

In the step 16, after applying a retardation to the ignition timing, as shown in FIG. 14, the ignition timing returns to the basic ignition timing ADVn. This return takes place rapidly for high loads and slowly for low loads.

In a step 17, a timer is started when the aforesaid cam change-over signal is output, and if the timer counter value coincides with the time (tCAM−$tTVO_1$), the throttle valve 57 is closed by an amount $\Delta TVO_1$. Further, in a step 18, when the timer counter value coincides with the time tCAM, the ignition timing is retarded by $\Delta ADV_1$ compared to the basic ignition timing ADVn.

By reducing the throttle valve opening before the cam change-over and temporarily retarding the ignition timing compared to the optimum ignition timing (MBT) when a cam change-over is performed, torque variations due to the change-over are absorbed and smooth running conditions are maintained.

FIGS. 16 to 21 show another example of this invention when a power cam is changed over to the economy cam.

In this case, the same power control is basically carried out as in the previous embodiment. To maintain the same torque, the throttle valve opening is increased when the cam change-over is made, but the torque generated immediately after the change-over is temporarily lower than the target torque due to the effect of the large negative intake pressure based on the small throttle valve opening before the cam change-over.

Figure 21:
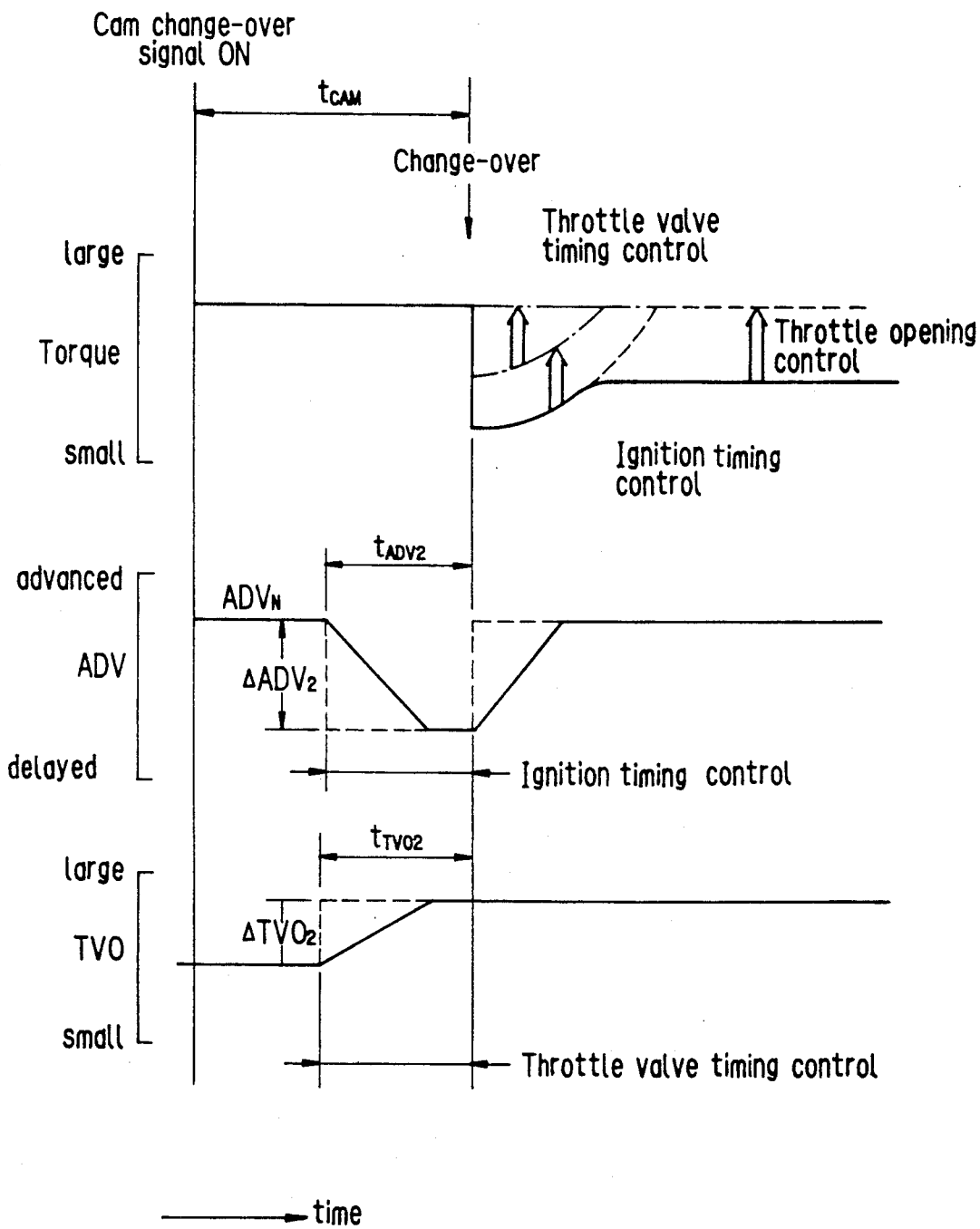
FIG. 21 is a wave pattern showing control characteristics of engine torque, ignition timing and throttle opening according to this invention when a change-over is made from a power cam to the economy cam.

As shown in FIG. 21 to make the torque the same before and after the cam change-over, the opening of the throttle valve 57 is increased by a predetermined amount $\Delta TVO_2$, at a predetermined time $tTVO_2$ earlier than the actual cam change-over which also takes account of the response delay which occurs in the air intake process.

Further, the ignition timing is adjusted to compensate for the torque reduction immediately after the change-over.

To increase the torque, the ignition timing must be advanced by a certain angle.

However, as the basic ignition timing ADVn before the cam change-over is set at an optimum ignition timing (MBT) so as to generate the best torque, the torque cannot be increased even if the ignition timing is advanced further.

Thus, as shown by the middle portion of FIG. 21, the ignition timing is retarded by a predetermined value $\Delta ADV_2$ compared to the basic ignition timing only at a predetermined time $tADV_2$ before the cam change-over point, and when the change-over point is reached, the ignition timing is returned to the basic ignition timing.

Figure 16:
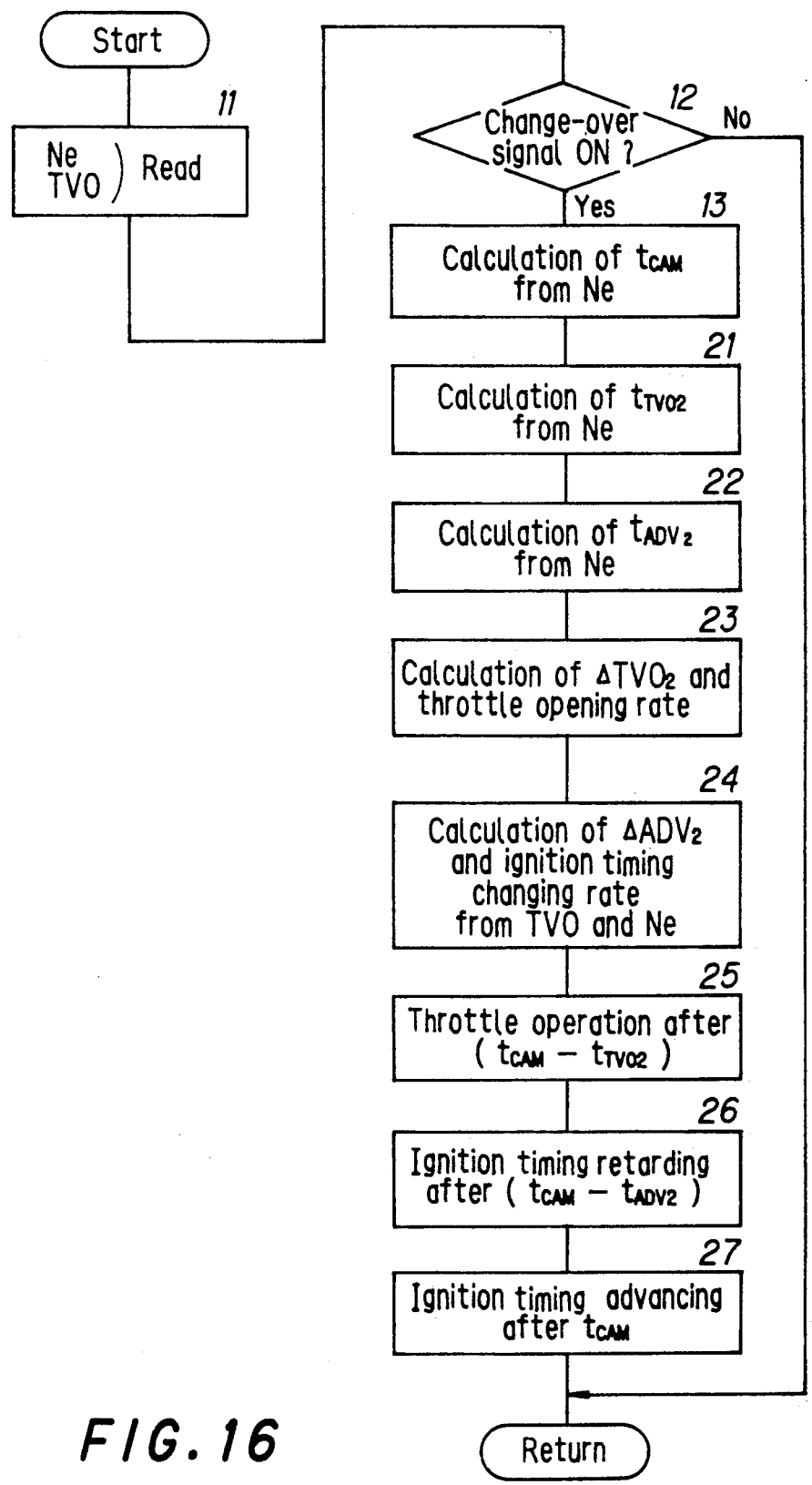
FIG. 16 is a flowchart showing a control process of the throttle valve opening and ignition timing according to this invention when a change-over is made from a power cam to the ecomomy cam.

This control is described by the flowchart of FIG. 16, which will now be described essentially in terms of its difference from the aforesaid flowchart of FIG. 8.

Figure 17:
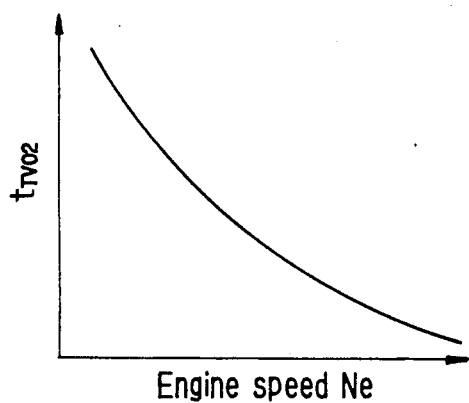
FIG. 17 is a graph showing the throttle valve operation period according to this invention based on the engine speed.
Figure 18:
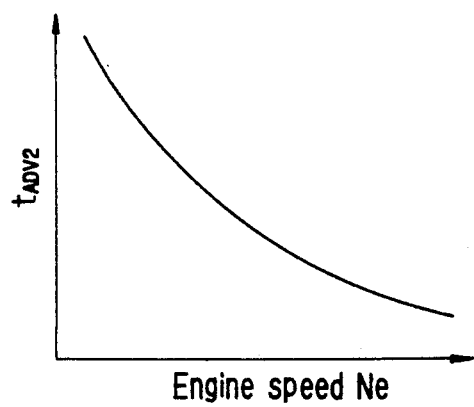
FIG. 18 is a graph showing the period of applying a retardation to the ignition timing according to this invention based on the engine speed.

In steps 21 and 22, a starting time of the throttle valve opening correction $tTVO_2$ and a starting time of the ignition timing correction $tADV_2$ are computed based on the engine speed Ne with reference to the maps of FIG. 17 and FIG. 18.

Figure 19:
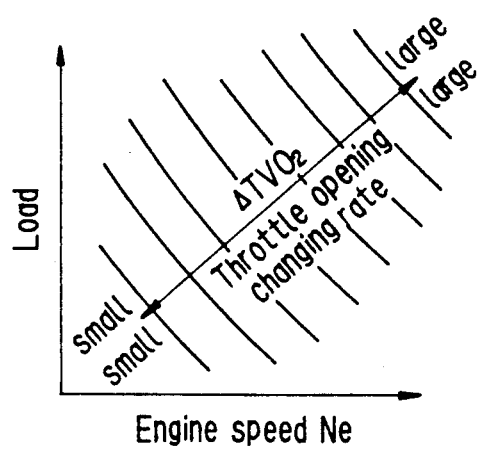
FIG. 19 is a graph showing a correction amount of the throttle valve opening according to this invention based on the engine speed and load.
Figure 20:
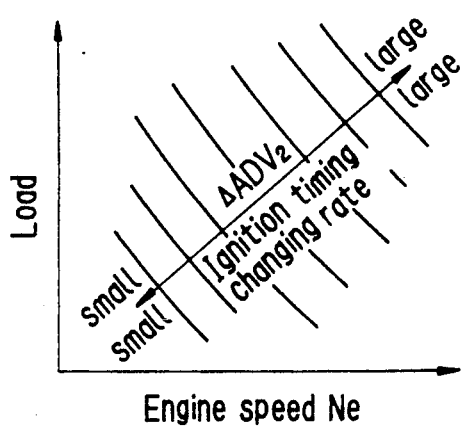
FIG. 20 is a graph showing a correction amount of the ignition timing according to this invention based on the engine speed and load.

Further, in steps 23 and 24, the throttle valve opening correction amount $\Delta TVO_2$ and the ignition timing correction amount $\Delta ADV_2$ are respectively computed from the engine speed Ne and the load with reference to the maps of FIGS. 19 and 20.

In the middle portion of FIG. 21, as shown by the solid line, the ignition timing and the throttle valve opening are not varied in stepwise fashion. Once a cam change-over signal has been output, the ignition timing is retarded gradually after a time (tCAM−$tADV_2$) has elapsed, and the throttle valve opening is increased gradually after a time (tCAM−$tVO_2$) has elapsed (steps 25 and 26).

By applying these corrections to the throttle valve opening and ignition timing gradually in the aforesaid manner, torque variations before and after the cam change-over are smoothed out, and the driving performance of the vehicle is not adversely affected.

FIGS. 19 and 20 respectively show the correction amount of the throttle valve opening and the ignition timing when a cam change-over is performed.

After the ignition timing is corrected on the retardation side, it is gradually advanced toward the optimum ignition timing after a time tCAM has elapsed following the output of the cam change-over signal, which corresponds to the actual cam change-over point (step 27).

Figure 23:
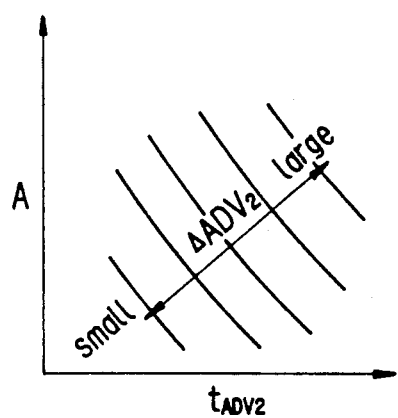
FIG. 23 is a graph showing the number of cylinders to which ignition timing control is simultaneously applied according to this invention.
Figure 22:
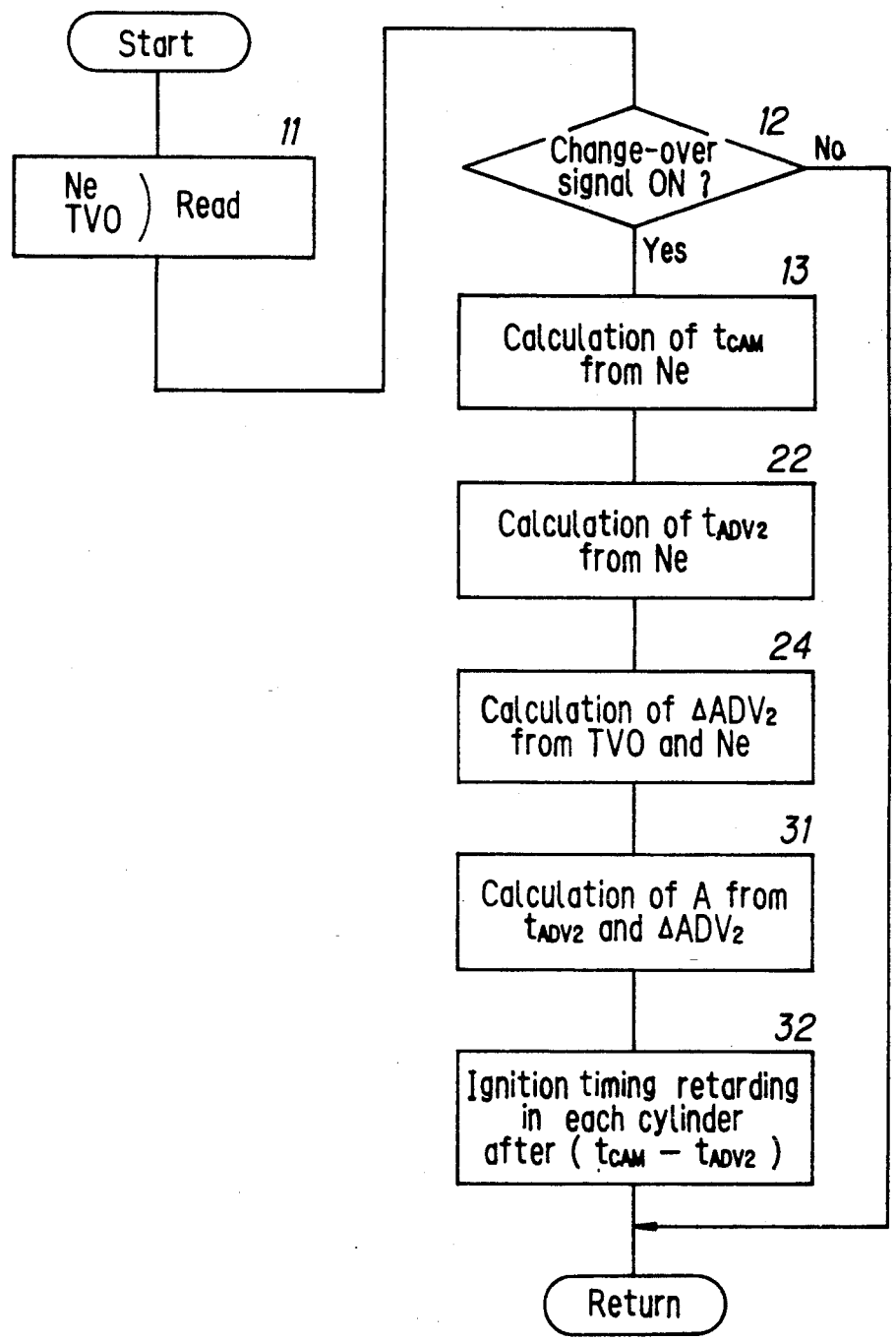
FIG. 22 is a flowchart showing another control process of the ignition timing according to this invention when a changeover is made from a power cam to the economy cam.
Figure 24:
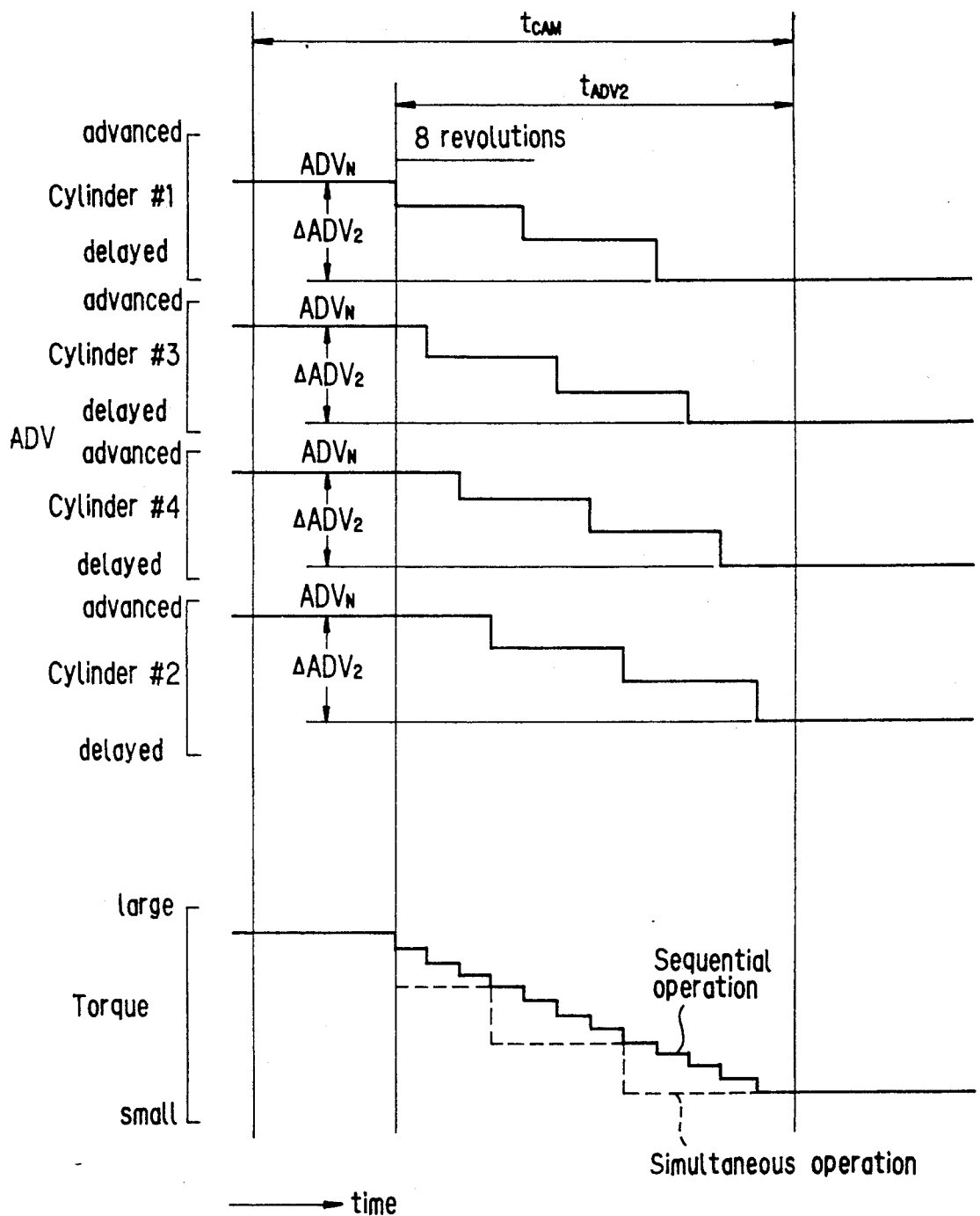
FIG. 24 is a wave pattern showing the ignition timing control in a multiplicity of cylinders according to this invention when a change-over is made from a power cam to the economy cam.

When a power cam is changed over to the economy cam, therefore, the ignition timing is first retarded and then advanced. FIG. 22 to FIG. 24 show another control sequence to retard the ignition timing.

In a multi-cylinder engine, retarding the ignition timing for all cylinders together before performing a cam change-over causes a sharp variation of torque and driving performance of the vehicle is adversely affected. To avoid this problem, in a four cylinder engine, for example, the ignition timing is retarded one cylinder at a time.

Further, for any specific cylinder, the ignition timing is not retarded by the entire predetermined value $\Delta ADV_2$ all at once. The retardation may for example be performed in several stages, for example three stages as shown in FIG. 24.

It is also possible to retard the ignition timing not just for one cylinder but for one group of cylinders at a time. In this case the number of cylinders A in the cylinder group depends on $tADV_2$ which corresponds to the retardation starting time and retardation angle $\Delta ADV_2$ of the ignition timing as shown in FIG. 23.

These operations correspond to steps 31 and 32 in the flowchart of FIG. 22. The flowchart of FIG. 22 shows only the retardation of the ignition timing. In practice, it is carried out together with the control of throttle valve opening, and the control of ignition timing to return to the optimum ignition timing. As these operations are the same as those of the aforementioned flowchart of FIG. 18, however, they are omitted from the flowchart of FIG. 22.

Thus, by applying a retardation to the ignition timing gradually for each cylinder in turn before the cam change-over, torque fluctuations due to the ignition retardation before the cam change-over are smoothed out.

FIGS. 25–28 show the control sequence if the engine is equipped with a limiter limiting the amount of the ignition timing correction when a cam change-over is performed. In this case a control sequence as shown in these figures is applied for modifying the range of the action of the limiter.

In general, the ignition timing is adjusted according to the running condition of the engine such that it is equivalent to the MBT. In order to prevent the occurrence of knocking, the ignition timing adjustment range at a time is limited by the limiter such that it lies within a range of, for example, 3 to 5 degrees. Depending on the correction that has to be applied to the ignition timing as required by the cam change-over, the adjustment angle may reach 20 degrees. As however this correction is limited by the limiter, the result is that the torque variation cannot be rapidly absorbed when the cam change-over is performed.

Figure 28:
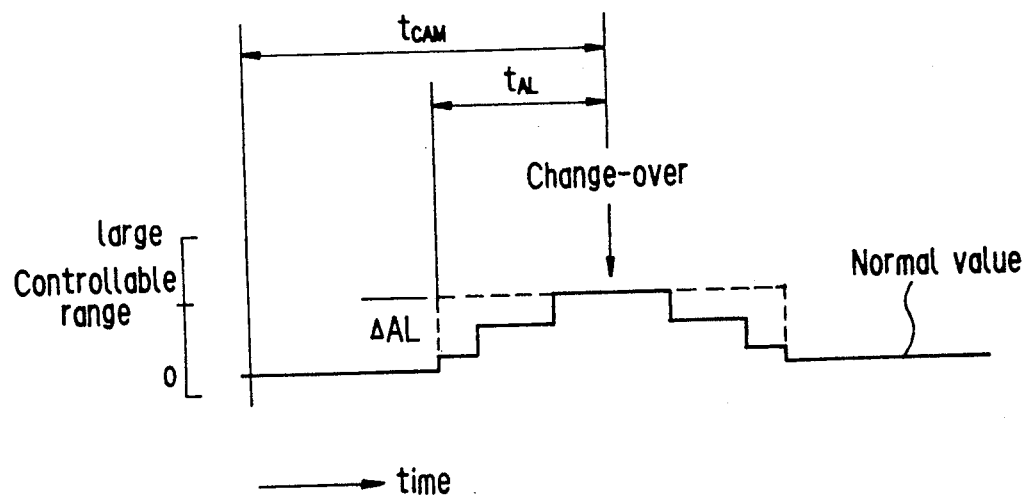
FIG. 28 is wave pattern showing the limiter control characteristics according to this invention when a cam changeover is performed.

As shown in FIG. 28, therefore, this problem is solved by widening an allowable range of the ignition timing control when a cam change-over is performed.

Figure 25:
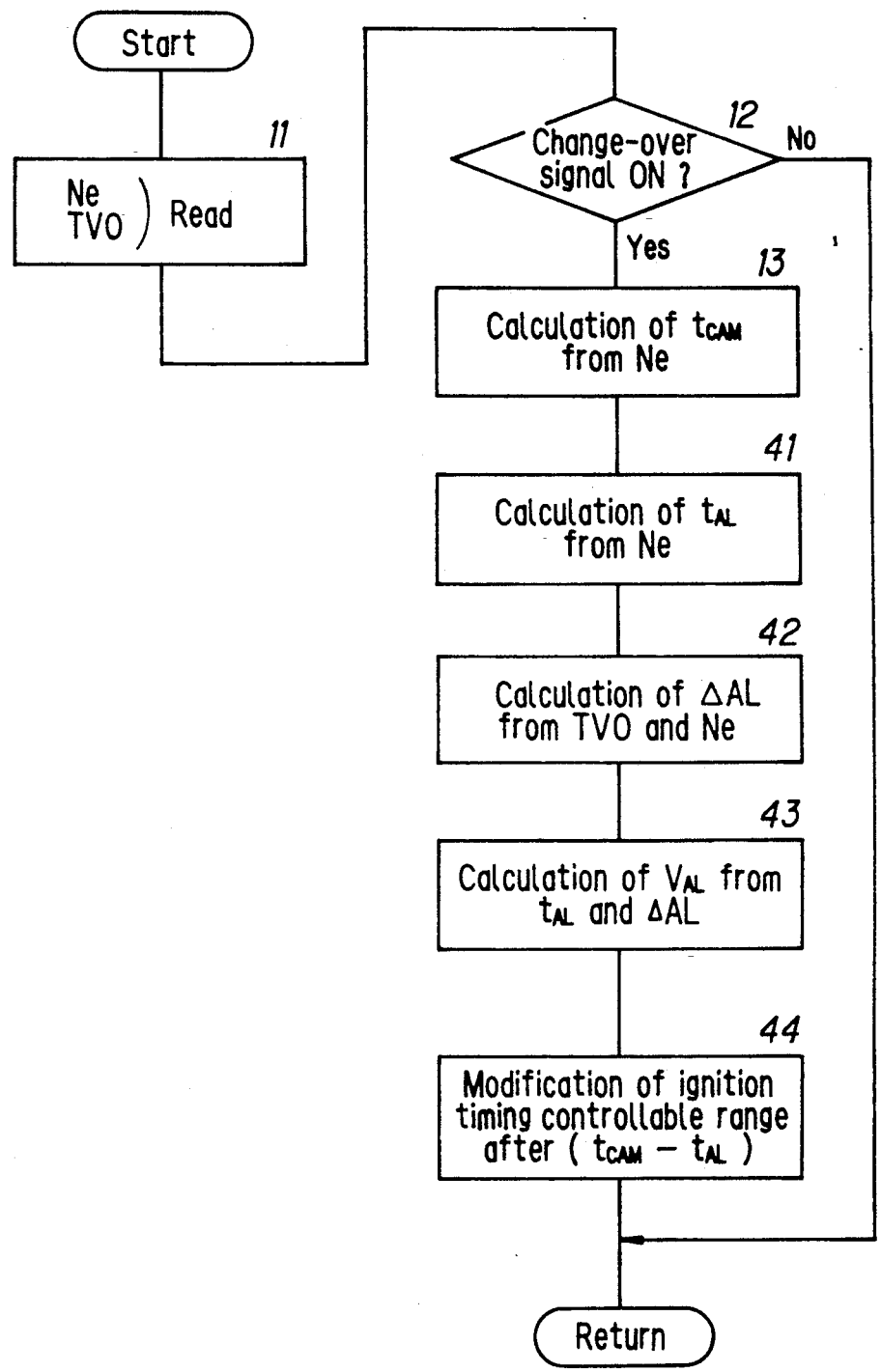
FIG. 25 is a flowchart showing a control process of a limiter regulating a control width of the ignition timing according to this invention when a cam change-over is performed.
Figure 26:
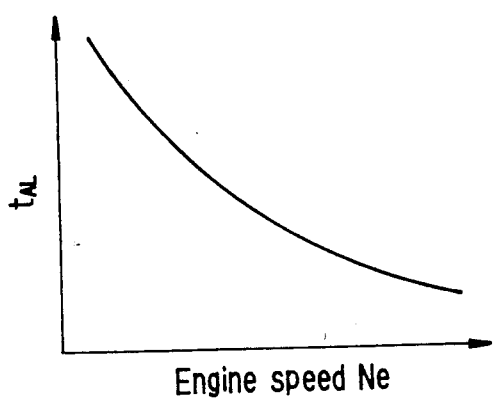
FIG. 26 is a graph showing a period when the limiter control begins according to this invention based on the engine speed.
Figure 27:
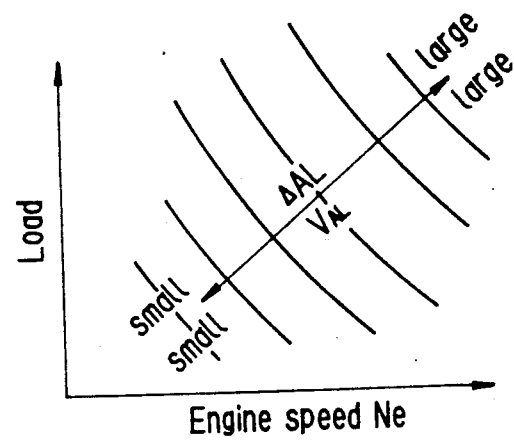
FIG. 27 is a graph showing the control width of the limiter according to this invention based on the engine speed and load.

In the flowchart of FIG. 25, in a step 41, the time tAL when the allowable range by the limiter is widened is computed with reference to the map of FIG. 26. Further, the range of variation from the normal limitation value $\Delta AL$ and a variation rate VAL are computed with reference to the map of FIG. 27 (steps 42 and 43).

In a step 44, after a cam change-over signal is output, the allowable range of variation begins to be increased after a time (tCAM−tAL) has elapsed. As shown in FIG. 28, this control continues until the cam change-over is actually performed, following which the allowable range starts to decrease again to its normal value.

FIGS. 29 to 32 show a method of absorbing torque variations wherein the air-fuel ratio is also temporarily varied from its theoretical value.

Figure 32:
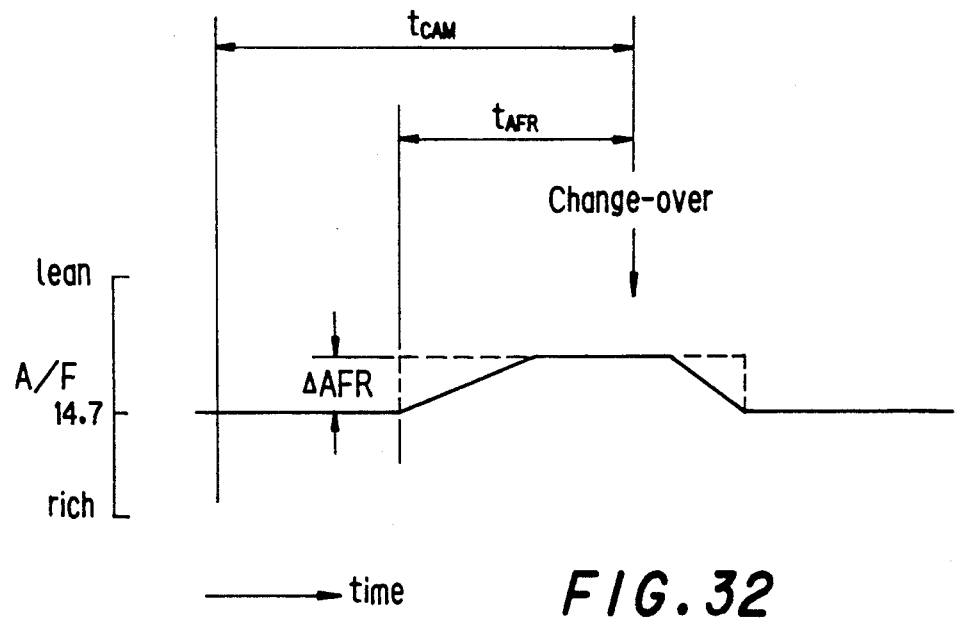
FIG. 32 is a wave pattern showing control characteristics of the air-fuel ratio according to this invention when a cam change-over is performed.

To reduce the torque shock due to the torque increase when the economy cam is changed over to a power cam, the throttle valve opening is decreased beforehand, the ignition timing is temporarily retarded, and as shown in FIG. 32, the air-fuel ratio supplied to the engine is temporarily adjusted to a leaner value than the theoretical ratio.

Figure 29:
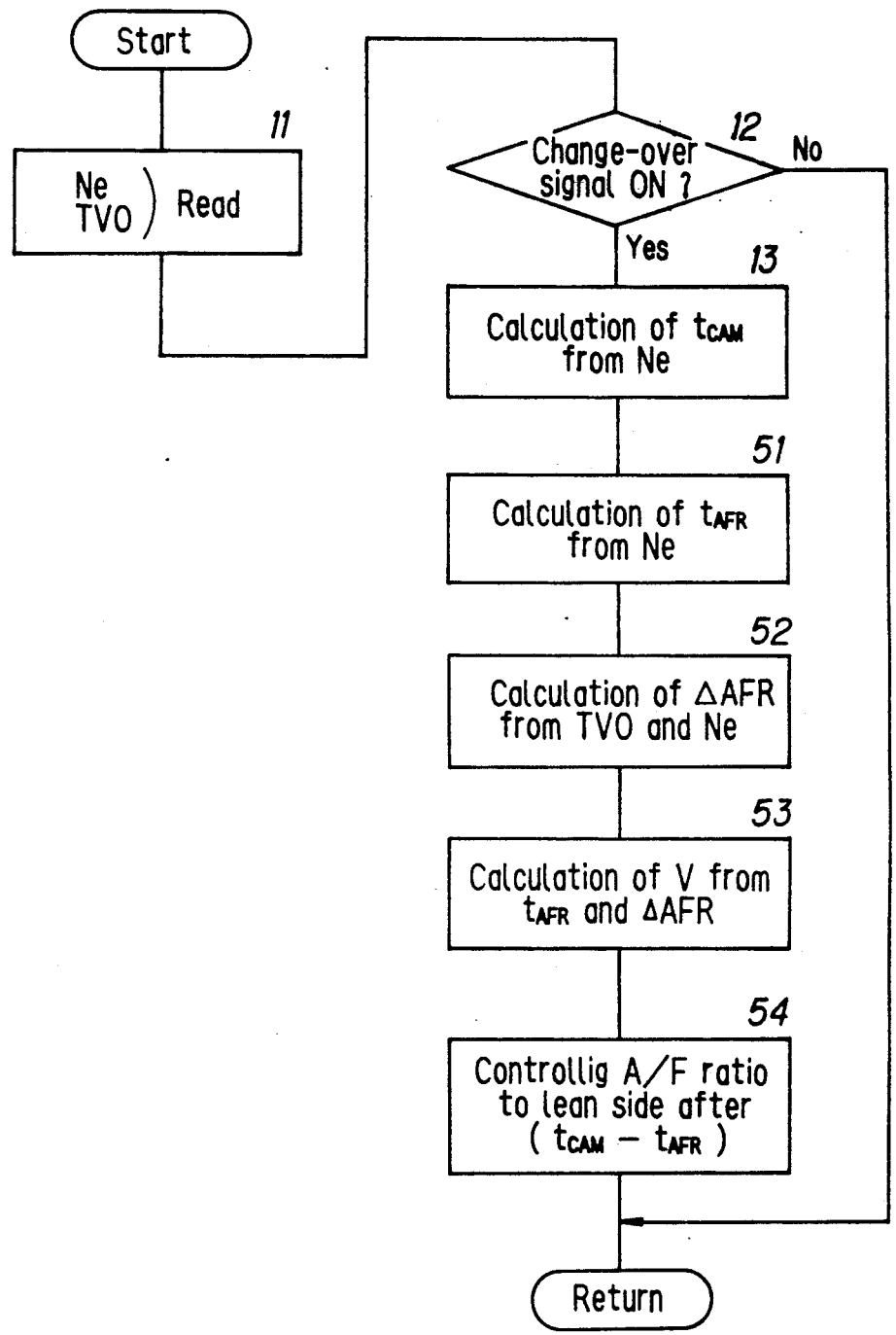
FIG. 29 is a flowchart showing a correction control process of an air-fuel ratio according to this invention when a cam change-over is performed.
Figure 30:
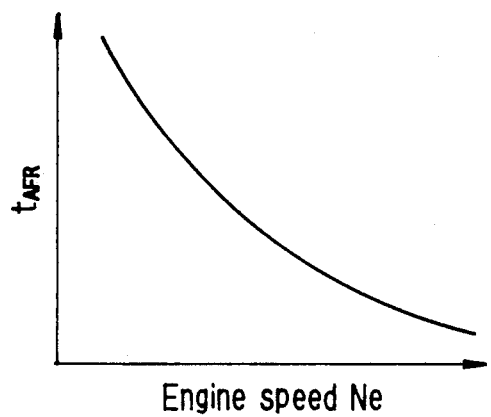
FIG. 30 is a graph showing a period when the air-fuel ratio correction begins according to this invention based on the engine speed.

In the flowchart of FIG. 29 therefore, in a step 51, a time tAFR at which control of the air-fuel ratio begins is computed from the engine speed Ne with reference to the map of FIG. 30.

Figure 31:
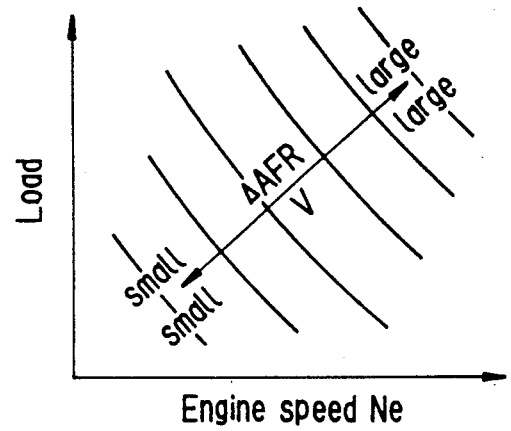
FIG. 31 is a graph showing a correction amount of the air-fuel ratio according to this invention based on the engine speed and the load.

Then, in steps 52 and 53, the amount $\Delta AFR$ and the rate of variation V of the air-fuel ratio are computed with reference to the map of FIG. 31.

When a time (tCAM−tAFR) has elapsed after the output of the cam change-over signal the air-fuel ratio begins to be adjusted toward the lean side.

By adjusting the air-fuel ratio to a leaner value, the torque generated by the engine is decreased, and the temporary increase of the torque accompanying a change-over from the economy cam to a power cam can be absorbed. This leaner value is adopted until the cam change-over is performed, following which it returns to the theoretical air-fuel ratio.

Thus, by controlling the throttle valve opening, correcting the ignition timing and correcting the air-fuel ratio, the torque shock accompanying a cam change-over is more effectively absorbed, and even if response delays occur in the throttle valve opening and ignition timing controls, they can be compensated to some extent by this air-fuel ratio control.

Likewise, the temporary decrease of the torque generated when a power cam is changed over to the economy cam can be compensated by adjusting the air-fuel ratio to a leaner value at a predetermined time before the cam change-over, and then returning it to its theoretical value immediately before the change-over is made.

The foregoing description of a preferred embodiment for the purpose of illustrating this invention is not to be considered as limiting or restricting the invention, since many modifications, including an application of this invention to an exhaust valve of a engine, may be made by those skilled in the art without departing from the scope of the invention.

The embodiments of this invention in which an exclusive property or privilege is claimed are defined as follows:

1. A power controller for a variable cam engine having a cylinder, an intake and exhaust passages connected to said cylinder, a throttle valve installed in said intake passage, an accelerator pedal controlling an aperture of said throttle valve, an igniter igniting a fuel in said cylinder, valves fitted to said intake and exhaust passages to open and close said passages, one of said valves being driven selectively by a power cam having a profile which gives a large output torque to the engine and an economy cam having a profile which gives good fuel cost performance, means for selecting a cam from among said cam according to a running condition of the engine, and a cam change-over mechanism which disengages a current cam from said valve and engages the selected cam instead, said power controller comprising:
  means for detecting the depression of said accelerator pedal,
  means for controlling the opening of said throttle valve according to the accelerator depression,
  means for detecting a current opening of said throttle valve,
  means for computing a target opening of said throttle valve after the cam change-over such that a torque generated after the cam change-over is the same as a torque generated before the cam change-over, means for correcting the opening of said throttle valve to the target opening computed, when the cam change-over is performed, means for comparing the target opening computed and the current opening of said throttle valve, means for advancing the correction of the throttle valve opening to the target opening at a predetermined time period before the cam change-over, when the target opening computed is smaller than the current opening, means for controlling an ignition timing of said igniter to an optimum timing for generating maximum output torque, and means for retarding the ignition timing during a predetermined period from the cam change-over.

2. A power controller for a variable cam engine as defined in claim 1, wherein the retardation value of the ignition timing is increased according to an increase of engine load.

3. A power controller for a variable cam engine as defined in claim 1, wherein the predetermined period set for said throttle valve opening correcting means is shortened according to the increase of engine speed.

4. A power controller for a variable cam engine having a cylinder, an intake and exhaust passages connected to said cylinder, a throttle valve installed in said intake passage, an accelerator pedal controlling an aperture of said throttle valve, an igniter igniting a fuel in said cylinder, valves fitted to said intake and exhaust passages to open and close said passages, one of said valves being driven selectively by a power cam having a profile which gives a large output torque to the engine and an economy cam having a profile which gives good fuel cost performance, means for selecting a cam from among said cams according to a running condition of the engine, and a cam change-over mechanism which disengages a current cam from said valve and engages the selected cam instead, said power controller comprising:

means for detecting the depression of said accelerator pedal, means for controlling the opening of said throttle valve according to the accelerator depression, means for detecting a current opening of said throttle valve, means for computing a target opening of said throttle valve after the cam change-over such that a torque generated after the cam change-over is the same as a torque generated before the cam change-over, means for correcting the opening of said throttle valve to the target opening computed, when the cam change-over is performed, means for comparing the target opening computed and the current opening of said throttle valve, means for advancing the correction of the throttle valve opening to the target opening at a predetermined time period before the cam change-over, when the target opening computed is larger than the current opening, means for controlling a ignition timing of said igniter to an optimum timing for generating maximum output torque, and means for retarding the ignition timing during a predetermined period preceding the cam change-over.

5. A power controller for a variable cam engine as defined in claim 4, wherein the predetermined period set for said ignition timing retarding means is shortened according to an increase of engine load.

6. A power controller for a variable cam engine as defined in claim 4, wherein the retardation angle of the ignition timing is increased according to the increase of engine load.

7. A power controller for a variable cam engine as defined in claim 4, wherein both the ignition timing retardation and its recovery to the optimum timing are performed gradually.

8. A power controller for a variable cam engine as defined in claim 4, wherein the engine is equipped with a plurality of cylinder and said retardation of the ignition timing is performed at each cylinder in order.

9. A power controller for a variable cam engine having a cylinder, an intake and exhaust passages connected to said cylinder, a throttle valve installed in said intake passage, an accelerator pedal controlling an aperture of said throttle valve, an igniter igniting a fuel in said cylinder, valves fitted to said intake and exhaust passages to open and close said passages, one of said valves being driven selectively by a power cam having a profile which gives a large output torque to the engine and an economy cam having a profile which gives good fuel cost performance, means for selecting a cam from among said cams according to a running condition of the engine, and a cam change-over mechanism which disengages a current cam from said valve and engages the selected cam instead, said power controller comprising:

means for detecting the depression of said accelerator pedal, means for controlling the opening of said throttle valve according to the accelerator depression, means for detecting a current opening of said throttle valve, means for computing a target opening of said throttle valve after the cam change-over such that a torque generated after the cam change-over is the same as a torque generated before the cam change-over.

means for correcting the opening of said throttle valve to the target opening computed, when the cam change-over is performed, means for comparing the target opening computed and the current opening of said throttle valve, means for advancing the correction of the throttle valve opening to the target opening at a predetermined time period before the cam change-over, when the target opening computed is smaller than the current opening, means for controlling an ignition timing of said igniter to an optimum timing for generating maximum output torque, means for retarding the ignition timing during a predetermined period from the cam change-over, and means for controlling a ratio of air and fuel supplied to the engine by a predetermined amount toward a leaner value during a certain time period including the time of the cam change-over.

10. A power controller for a variable cam engine having a cylinder, an intake and exhaust passages connected to said cylinder, a throttle valve installed in said intake passage, an accelerator pedal controlling an aperture of said throttle valve, an igniter igniting a fuel in said cylinder, valves fitted to said intake and exhaust passages to open and close said passages, one of said valves being driven selectively by a power cam having a profile which gives a large output torque to the engine and an economy cam having a profile which gives good fuel cost performance, means for selecting a cam from among said cams according to a running condition of the engine, and a cam change-over mechanism which disengages a current cam from said valve and engages the selected cam instead, said power controller comprising:

means for detecting the depression of said accelerator pedal, means for controlling the opening of said throttle valve according to the accelerator depression, means for detecting a current opening of said throttle valve, means for computing a target opening of said throttle valve after the cam change-over such that a torque generated after the cam change-over is the same as a torque generated before the cam change-over, means for correcting the opening of said throttle valve to the target opening computed, when the cam change-over is performed, means for comparing the target opening computed and the current opening of said throttle valve, means for advancing the correction of the throttle valve opening to the target opening at a predetermined time period before the cam change-over, when the target opening computed is larger than the current opening, means for controlling a ignition timing of said igniter to an optimum timing for generating maximum output torque, means for retarding the ignition timing during a predetermined period preceding the cam change-over, and means for controlling a ratio of air and fuel supplied to the engine by a predetermined amount toward a leaner value during a predetermined time period preceding the cam change-over.

* * * * *